United States Patent [19]

Carlin

[11] 4,424,764
[45] Jan. 10, 1984

[54] ANIMAL SPLINT

[76] Inventor: Milton O. Carlin, 4115 South Zunis, Tulsa, Okla. 74105

[21] Appl. No.: 416,111

[22] Filed: Sep. 9, 1982

[51] Int. Cl.³ .............................................. A01K 29/00
[52] U.S. Cl. ........................................ 119/96; 119/126
[58] Field of Search ................... 119/96, 103, 100, 98, 119/126, 127, 151; 269/328; 128/80 R, 80 A, 80 B, 84 R

[56] References Cited

U.S. PATENT DOCUMENTS

| 606,481 | 6/1898 | Eidsmoe | 119/127 |
| 664,794 | 12/1900 | Wallace | 119/127 |
| 1,168,867 | 1/1916 | Erickson | 119/127 |
| 3,250,252 | 5/1966 | Leopold | 119/103 |
| 4,003,341 | 1/1977 | La Croix | 119/103 |
| 4,186,688 | 2/1980 | Gaitan | 119/96 |

Primary Examiner—Gene Mancene
Assistant Examiner—Kris R. Schulze
Attorney, Agent, or Firm—Head, Johnson & Stevenson

[57] ABSTRACT

A forelimb splint or restraint for use by veternary hospitals in the intravenous feeding of animals, which immobilized the movable joints, especially the shoulder and elbow during treatment.

5 Claims, 4 Drawing Figures

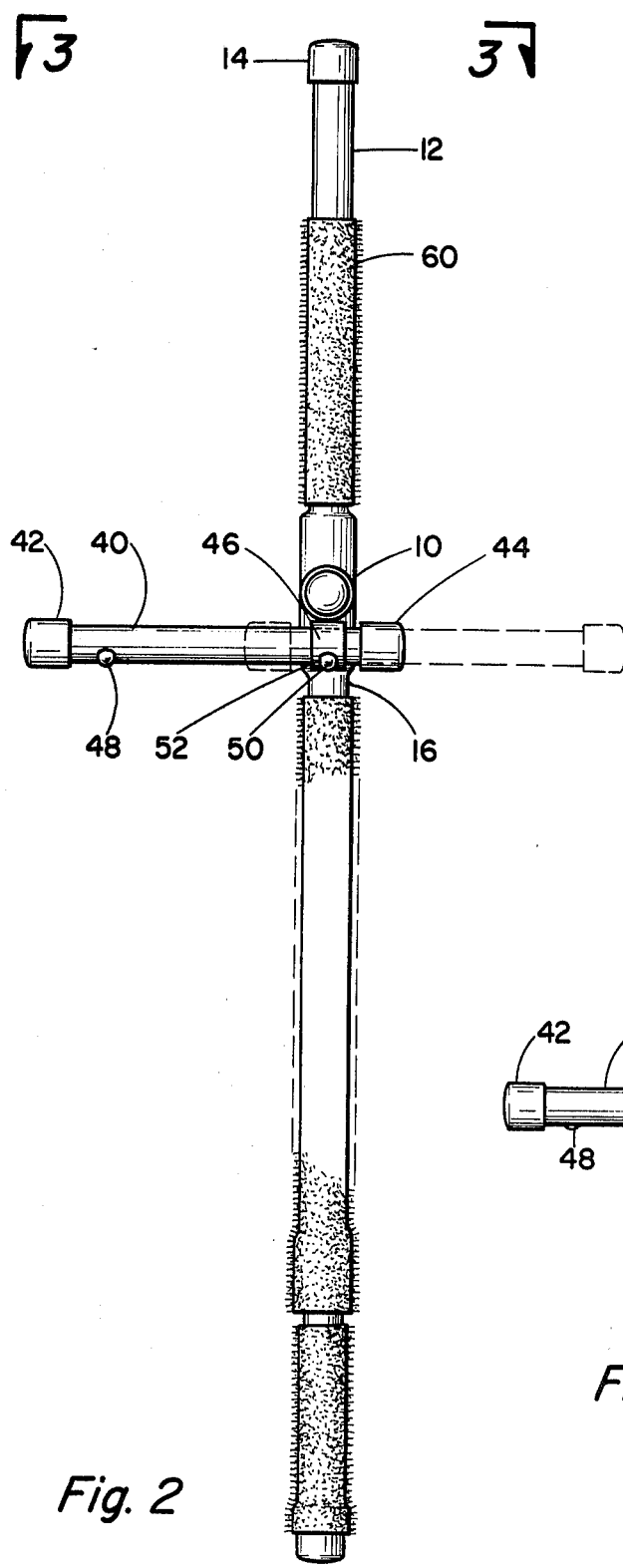
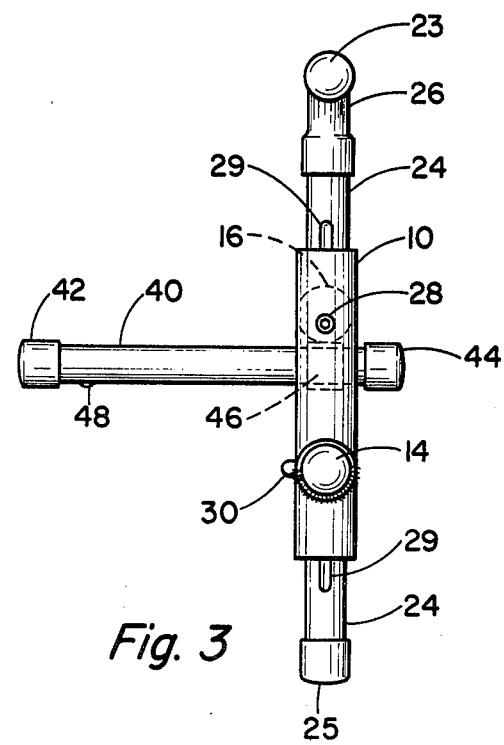
Fig. 2
Fig. 3

ANIMAL SPLINT

BACKGROUND OF THE INVENTION

The field of this invention is directed to animal restraint devices, and, in particular, a splint useful during intravenous feeding procedures. Intravenous feeding of animals is best accomplished by injecting the fluids into the vein of the animal's front limb between the elbow and the carpel.

The absence of some type of restraint allows the animal to move the forelimb by rotation or flexing of the limb, either at the elbow and/or the shoulder or clavicle joints which causes the needle to move in or out of the vein, thus making the procedure very difficult. The most common patient restraint is accomplished by continuous 'hands on restraint' by the hospital staff. When considering that intravenous feeding can take up to as much as two or three hours, places a burden upon personnel.

In the prior art there are a variety of splints which are primarily directed to the treatment of bone fractures, and are not useful or successful in intravenous feeding because they are not designed to restrain movement of both the shoulder and elbow joints of the animals legs, or interfere with proper placement of the needle.

SUMMARY OF THE INVENTION

It is an object of this invention to provide a splint capable of restraining movement of the limb of a dog or cat or other animal during intravenous feeding procedures.

Another specific object is to provide a splint for the forelimb of animals that will restrain or inactivate the shoulder and elbow joints from flexing and hold the limb in extension whereby intravenous feeding can take place without premature removal of the injection needle or other harm to the animal, that can otherwise take place by such movement.

A further object of the invention is to provide a splint or restraint for the forelimb of animals which is adjustable to the various sizes of animals and/or their forelimbs. Such adjustment can occur by various types of releasable locking devices for the movement of the various parts of the splint.

In particular, the invention is directed to a restraint or splint for the forelimb of animals wherein a basic tubular frame is provided in a horizontal position. The relationship of the various parts of the invention are described herein for clarity relative to the horizontal and vertical although the invention is capable of use while the animal is standing or lying down or in any position. Extending upwardly from the frame and adjacent one end of the tubular frame is a first vertical member, usually of fixed length. Extending downwardly from the frame adjacent the other end is a second vertical member, which may be adjustable in its length. A third L-shaped member formed of a vertical and horizontal part the latter of which is adapted to be adjustable inwardly and outwardly relative to the tubular frame. The vertical part is substantially parallel to the first vertical member while the horizontal part is telescopically movable and fixable to the tubular frame. In the typical construction of the apparatus the frame, the first and second vertical members and the third member, when in working position, all lie in the same imaginary vertical plane. A fourth member is positioned adjacent the intersection of the second vertical member and is movable in an inwardly and outwardly direction that is transverse to the vertical plane. In the ordinary use of the invention, some form of a strap is to be provided to encircle various parts of the forelimb and the splint of this invention. In a preferred embodiment strapping such as is sold under the trademark "VELCRO" is utilized, as hereinafter described.

BRIEF DESCRIPTION OF THE DRAWINGS

FIG. 2 is a right side elevational view taken along the lines of 2—2 of FIG. 1.

FIG. 3 is a top elevational view of the splint of this invention taken along the lines of 3—3 of FIG. 2.

BRIEF DESCRIPTION OF THE PREFERRED EMBODIMENT

Before explaining the present invention in detail, it is to be understood that the invention is not limited in its application to the details of the construction and arrangement of parts illustrated in the accompany drawings. The invention is capable of other embodiments and of being practiced or carried out in a variety of ways. It is to be understood that the phraseology and terminology employed herein is for the purpose of description and not of limitation.

Figure 1:
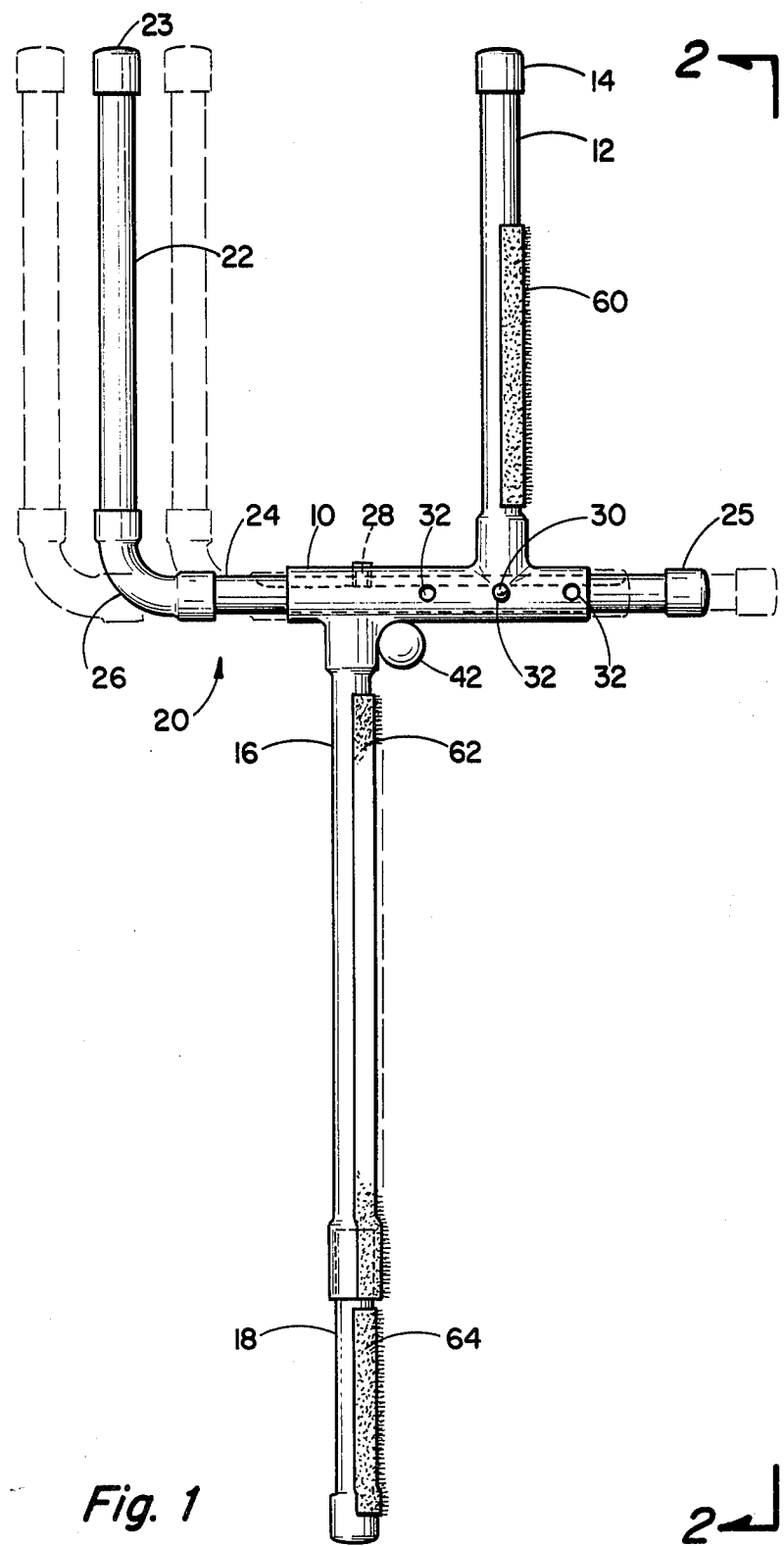
FIG. 1 is a front elevational view of the splint of this invention.

Referring to FIGS. 1, 2 and 3 the splint of this invention comprises a basic tubular frame 10 which is open at both ends for purposes herein described. Extending upwardly adjacent one end of the tubular frame 10 is a first vertical member 12, which in this embodiment is also a tubular member. A protective cap 14 is provided at the end of the first vertical member. A second vertical member 16 is fixed to said frame 10 adjacent its other end and extends downwardly as shown. An extension member 18 is telescopically movable within the second vertical member 16 for adjustment relative to the length of the lower portion of forelimb of the animal. A third member generally indicated by the numeral 20 is formed of a vertical part 22 and a horizontal part 24. Caps 23 and 25 protect the ends of the parts. The vertical part extends substantially parallel and typically about the same length as the first vertical member 12. In this embodiment the horizontal member 24 is attached to the vertical member by an elbow 26. The horizontal member 24 is adapted to slide within the frame 10 to various positions as shown by the dotted lines depending upon the size of the shoulder area of the patient. A set screw or other indent 28 extends within a slot 29 of the horizontal part 24 to maintain the third member in the same imaginary plane of the first vertical member 12. The third member 20 is fixable to the frame 10 by any form of lock bolt arrangement or as shown by a spring loaded detent button 30 formed inside the horizontal part 24 of the third member. A plurality of detent opening 32 are provided for fixing the third member in the desired position, by pushing the detent button and sliding member 20 to the next opening 32.

The frame 10, the first vertical member 12, second member 16 and the third member are constructed so as to lie in the same imaginary vertical plane.

A fourth member 40 is positioned adjacent the intersection of the second vertical member and the frame so as to be movable in an inwardly and outwardly direction that is transverse to the defined imaginary vertical plane. That is, in this view, into and out of the plane of the paper. This is best described with reference to FIGS. 2 and 3. The fourth member is comprised of a basic tubular housing 40 with protective caps at each end 42 and 44. The member is slidable through a ring 46 attached at the define intersection. Spring detents 48 and 50 are formed as a part of the tubular member 40 adjacent each end and are operable to be locked in an opening 52 formed as a part of the ring 46. The purpose of the fourth member is to permit the apparatus to be utilized with a right and/or left forelimb of the animal by turning the device over, or otherwise positioning the splint such that the vertical part 22 is always located anterior of the limb and sliding the member 40 as shown by the dotted lines.

Figure 4:
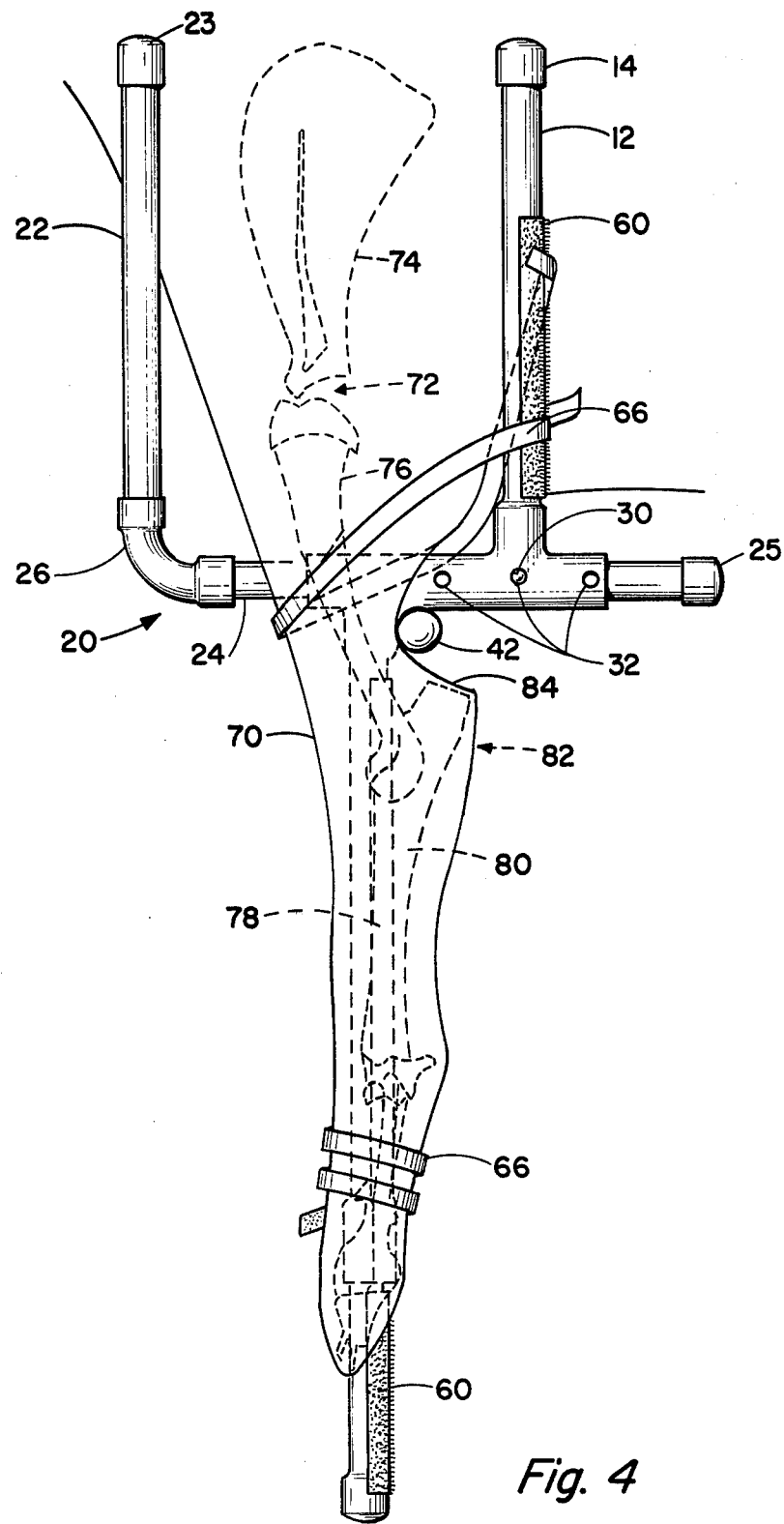
FIG. 4 is a front elevational view showing the invention in use relative to the forelimb of an animal.

In the preferred embodiment of the invention, strapping such as is sold under the mark "VELCRO" is used to affix the forelimb to the splint of this invention. In the embodiment shown, the 'hook' portion of the Velcro strapping 60 is affixed to the outside surface of the first vertical member 12. Likewise, additional 'hook' strapping 62 is positioned to the outside of the second vertical member 16, and an additional 'hook' strapping 64 is positioned to the same side of extension 18. As best shown in FIG. 4, the 'loop' portion of the Velcro strapping 66 can then be utilized in conjunction therewith as further restraint to movement of the animals forelimb.

The operation and use of the device is best described with reference to FIG. 4 wherein the left forelimb of the animal is shown in the restrained position relative to the splint of this invention.

In this view the animal forelimb is indicated by the solid outline 70, with the bone structure show in dotted lines. The shoulder joint 72 is formed at the junction of the Scapula 74 and the Humerus 76. One important function of the apparatus is to adjust the third member 20 toward the first member 12 such that the anterior pressure causes an extension of the joint 72, and thus immobilize the shoulder joint movement. The lower part of the limb is structured by the Radius bone 78 and Ulna 80 which joins at the elbow 82. The Ulna 80 terminates at the top by the Olecranon 84 that forms the outward part of the elbow. Thus a second function of the splint of this invention is to immobilize the elbow movement by locking the elbow below the fourth member 40 which acts as a fulcrum when the lower limb is strapped to the second vertical member 16.

Although the invention is shown to be manufactured of tubular metal, this is not limiting as other non-metallic, i.e. high density plastics could be used in the construction. Also, the invention can be adapted for use with the aft limbs and can be used to treat fractures.

What is claimed is:

1. A limb splint for restraining movement of an animal's limb which includes a shoulder and elbow comprising:

a tubular horizontal frame;

a first vertical member fixed to said frame adjacent one end and extending upwardly therefrom a second vertical member fixed to said frame adjacent the other end and extending downwardly therefrom a third member formed of a vertical and a horizontal part, the vertical part substantially parallel to said first vertical member, said horizontal part telescopically movable and fixable within said tubular frame to restrain movement of said shoulder;

said frame, said first, and second vertical members and said third member, all lying in the same imaginary vertical plane;

a horizontal fourth member positioned adjacent to the intersection of said second vertical member and said frame so as to be movable relative said frame in an inward or outward direction that is transverse to said vertical plane, and means to strap said animal limb to said splint whereby said fourth member is located above the said elbow of said animals.

2. A splint of claim 1 including means to vertically extend the length of said second vertical member.

3. A splint of claims 1 or 2 wherein said strap means includes a first Velcro member attached to an outside edge of said first and second vertical members.

4. A splint of claim 1 wherein said fourth member is movably fixable to said intersection.

5. A splint of claims 1 or 2 wherein said splint is constructed of tubular material.

* * * * *